(12) United States Patent
Wacker

(10) Patent No.: US 11,799,388 B2
(45) Date of Patent: Oct. 24, 2023

(54) DRIVE SYSTEM HAVING A FIRST CONVERTER AND AT LEAST ONE SECOND CONVERTER

(71) Applicant: SEW-EURODRIVE GMBH & CO. KG, Bruchsal (DE)

(72) Inventor: Maik Wacker, Östringen (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 232 days.

(21) Appl. No.: 17/424,645

(22) PCT Filed: Jan. 13, 2020

(86) PCT No.: PCT/EP2020/025009
§ 371 (c)(1),
(2) Date: Jul. 21, 2021

(87) PCT Pub. No.: WO2020/151913
PCT Pub. Date: Jul. 30, 2020

(65) Prior Publication Data
US 2022/0094280 A1    Mar. 24, 2022

(30) Foreign Application Priority Data
Jan. 21, 2019   (DE) .......................... 102019000332.2

(51) Int. Cl.
*H02M 5/42*   (2006.01)
*H02M 1/00*   (2006.01)
(Continued)

(52) U.S. Cl.
CPC ........... *H02M 5/42* (2013.01); *H02M 1/0067* (2021.05); *H02M 7/493* (2013.01); *H02M 1/008* (2021.05); *H02M 7/4826* (2013.01)

(58) Field of Classification Search
CPC .. H02M 1/0067; H02M 1/008; H02M 7/4826; H02M 7/493; H02M 5/42
See application file for complete search history.

(56) References Cited

U.S. PATENT DOCUMENTS 3,340,458 A * 9/1967 Keller ..................... H02M 1/14
363/48
7,053,569 B2   5/2006 Takahashi
(Continued)

FOREIGN PATENT DOCUMENTS

DE          4235223 C1     11/1993
DE         10147472 A1      4/2003
(Continued)

OTHER PUBLICATIONS

International Search Report issued in corresponding International Application No. PCT/EP2020/025009, dated Apr. 30, 2020, pp. 1-2, English Translation.

Primary Examiner — Jue Zhang
(74) Attorney, Agent, or Firm — CARTER, DELUCA & FARRELL LLP

(57) ABSTRACT

A drive system includes a first converter and at least one second converter. The first converter has, inside its housing, a first rectifier whose DC-voltage-side terminal is connected, e.g., directly connected, to the DC-voltage-side terminal of a first inverter of the first converter. A first capacitance is connected in parallel with the DC-voltage-side terminal of the first inverter. The second converter, or each second converter, has, inside its housing, a second rectifier whose DC-voltage-side terminal is connected via inductivities, i.e., for example, restrictors, to the DC-voltage-side terminal of a second inverter of the second converter. A second capacitance is connected in parallel with the DC-voltage-side terminal of the second inverter, and the DC-voltage-side
(Continued)

terminal of the first inverter is connected via first inductivities to the DC-voltage-side terminal of the second inverter.

18 Claims, 1 Drawing Sheet

(51) Int. Cl.
*H02M 7/493* (2007.01)
*H02M 7/48* (2007.01)

(56) References Cited

U.S. PATENT DOCUMENTS

| | | | |
|---|---|---|---|
| 10,084,310 B1 | 9/2018 | Neely et al. | |
| 2003/0058597 A1 | 3/2003 | Bruckmann et al. | |
| 2010/0246230 A1* | 9/2010 | Porter | G05F 5/00 |
| | | | 363/131 |
| 2016/0327998 A1* | 11/2016 | Webster | H02M 1/15 |
| 2016/0352216 A1* | 12/2016 | Sonnaillon | H02M 1/4208 |

FOREIGN PATENT DOCUMENTS

| | | | | |
|---|---|---|---|---|
| DE | 102005031372 A1 | 1/2007 | | |
| EP | 2067227 B1 * | 11/2010 | | B60L 9/08 |
| GB | 2427512 A | 12/2006 | | |
| WO | 2008031587 A2 | 3/2008 | | |
| WO | 2017127856 A1 | 8/2017 | | |

\* cited by examiner

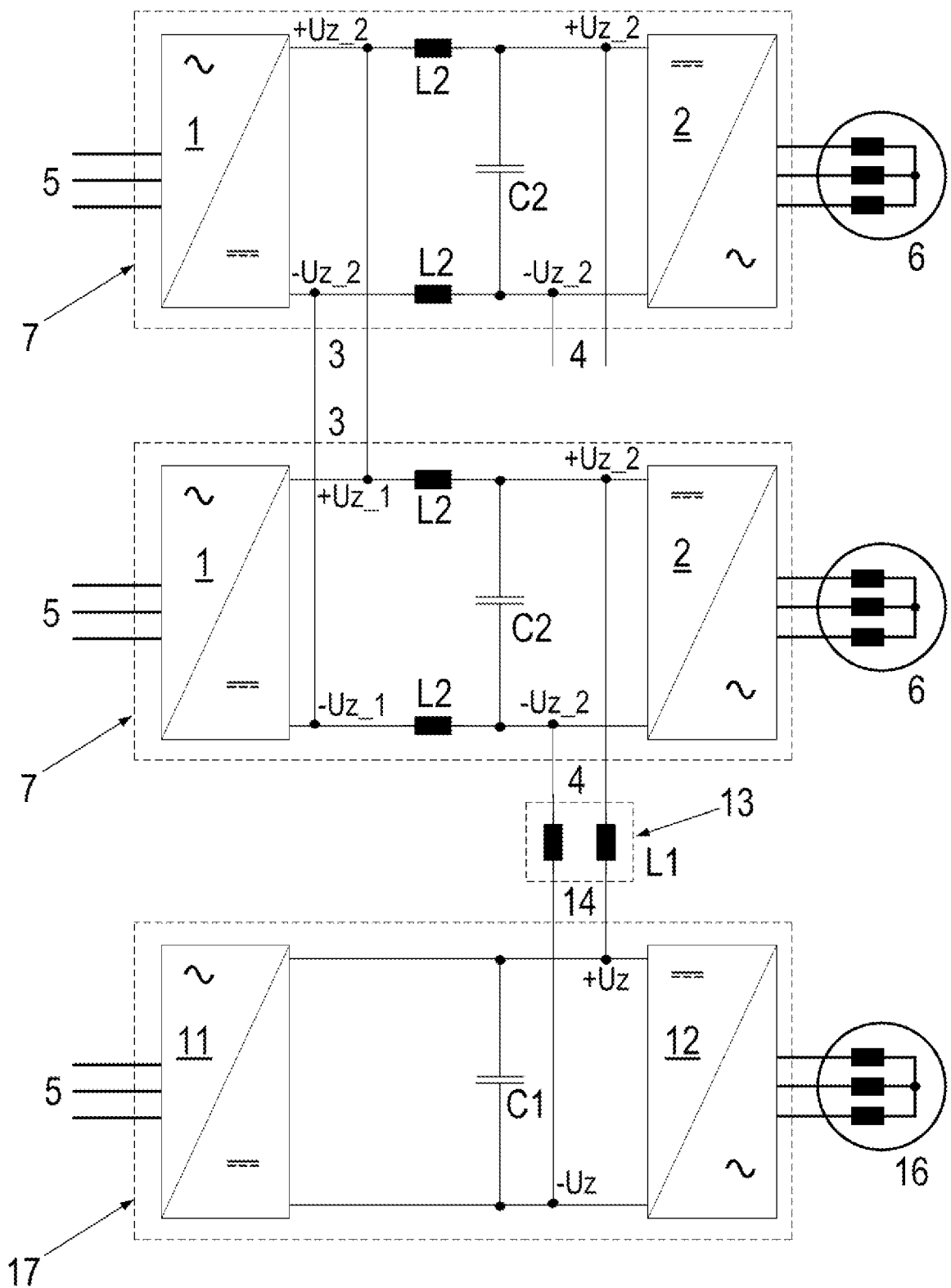

DRIVE SYSTEM HAVING A FIRST CONVERTER AND AT LEAST ONE SECOND CONVERTER

FIELD OF THE INVENTION

The present invention relates to a drive system having a first converter and at least one second converter.

BACKGROUND INFORMATION

Certain conventional electric motors can be supplied with the aid of a converter in order to control the rotational speed of the motor.

German Patent Document No. 42 35 223 describes a circuit configuration for the operation and joint braking of multiple three-phase motors which are non-positively connected via a load and individually connected to converters.

U.K. Patent Document No. 2 427 512 describes a converter.

German Patent Document No. 101 47 472 describes a power converter device.

German Patent Document No. 10 2005 031 372 describes an inverter having a sine-wave filter.

PCT Patent Document No. WO 2017/127856 describes a circuit configuration for a frequency converter.

U.S. Pat. No. 10,084,310 describes a low-inductance direct current power bus.

U.S. Patent Application Publication No. 2016/0327998 describes a low-capacitance drive having better immunity.

U.S. Pat. No. 7,053,569 describes an inverter control method.

SUMMARY

According to an example embodiment of the present invention, a drive system includes a first converter and at least one second converter. The first converter has inside its housing a first rectifier whose DC-voltage-side terminal is connected, e.g., directly connected, to the DC-voltage-side terminal of a first inverter of the first converter. A first capacitance is connected in parallel with the DC-voltage-side terminal of the first inverter. The second converter, or each second converter, has inside its housing a second rectifier whose DC-voltage-side terminal is connected via inductivities L2, i.e., for example, restrictors, to the DC-voltage-side terminal of a second inverter of the second converter. A second capacitance is connected in parallel with the DC-voltage-side terminal of the second inverter, and the DC-voltage-side terminal of the first inverter is connected via first inductivities L1 to the DC-voltage-side terminal of the second inverter.

This has the advantage that the intermediate circuits of the two converters support one another so that in a generator-mode operation of the motor supplied by one of the converters, its power can be used by the electric motor which is operated in a motor mode and supplied from the other one of the two converters. A lower power supply from the public grid is therefore possible. Important in this context is that the first converter has a small intermediate circuit yet it can still be connected to the second converter.

According to example embodiments t, the first inductivities L1 are situated inside a housing, which is separate and/or set apart from the housing of the first converter and from the housing of the second converter. This has the advantage that the first converter is connectable to the second converter. However, oscillations are avoided by an appropriate dimensioning of the first inductivities L1.

According to example embodiments, the first inductivities L1 are arranged as coil windings in each case which are wound around the same coil core. This offers the advantage that a reduction of oscillations is achievable as a result and the impact of magnetic stray fields on the environment is kept to a minimum.

According to example embodiments, the second capacitance C2 is arranged as a foil capacitor or as a polar capacitor. This has the advantage that higher-frequency voltage fluctuations are better able to be buffered in an arrangement as a foil capacitor, and a large intermediate circuit capacitance, i.e., efficient buffering, is able to be provided in a cost-effective manner when using the polar capacitor.

According to example embodiments, depending on the output of the second converter indicated in Kilowatt kW, the second capacitance C2 has a value of more than 15 µF/kW. This is considered advantageous insofar as powerful buffering of the intermediate circuit voltage is achievable. In particular, this intermediate circuit voltage thus drops only slightly within a network half-period even if the motor exhibits a large power usage.

According to example embodiments, first capacitance C1 is arranged as a foil capacitor. This offers the advantage that a cost-effective foil capacitor having a low capacitance may be used. Despite the thus considerable drop of the intermediate circuit voltage given a high power consumption of the motor, the motor can still be operated in an rpm-controlled manner. To this end, a corresponding control is provided in the signal electronics actuating the semiconductor switches of the inverter of the first converter, to which the acquired values of the intermediate circuit are also supplied, the pulse-width modulation period of the actuation signals of the semiconductor switches being set as a function of these acquired values of the intermediate circuit voltage.

According to example embodiments, depending on the output of the first converter indicated in Kilowatt kW, first capacitance C1 has a value of 5 µF/kW or less. This has the advantage that the converter makes it possible to operate the electric motor in an rpm-controlled manner despite the small intermediate circuit.

According to example embodiments, the DC-voltage-side terminal of the first inverter is routed to the outside to a first connection unit on the housing of the first converter. This is considered advantageous insofar as the electric connection provided on the housing makes it possible to electrically connect the second converter and to support the intermediate circuit in this manner. The connection may also be implemented as a plug-in connector, for instance.

According to example embodiments, the DC-voltage-side terminal of the second inverter is routed to the outside to a second connection unit on the housing of the second converter. This has the advantage that an electrical connection is thereby provided on the housing and the intermediate circuit can thus be supported. The connection may also be implemented as a plug-in connector, for instance.

According to example embodiments, the DC-voltage-side terminal of the second rectifier is routed to the outside to a third connection unit on the housing of the second converter, for example, such that a third connection unit on the housing of a further second converter is electrically connectable. This offers the advantage that an electrical connection is routed to the outside and an electrical connection of further converters is possible as a result.

According to example embodiments, the first inductivities L1 together with capacitance C1 form a first oscillating circuit and are dimensioned such that the resonant frequency of the first oscillating circuit lies between 1 kHz and 2 kHz. This is considered advantageous insofar as oscillations and/or resonances are avoidable.

According to example embodiments, the second inductivities L2 together with capacitance C2 form a second oscillating circuit and are dimensioned such that the resonant frequency of the second oscillating circuit has a value that is smaller than six times the frequency of the AC voltage system applied at the AC-voltage-side terminal of the second rectifier, e.g., less than 300 Hz. This has the advantage that the pulse-width-modulated power semiconductor switches of the inverter are unable to excite oscillations because they are operated at a frequency higher than the resonant frequency.

According to example embodiments, the first inductivities L1 are arranged as a coil winding situated around a ferrite core in each case. An auxiliary winding to which a current is applied is disposed on each one of the ferrite cores. This offers the advantage of allowing for an uncomplicated control intervention, it being possible to use the DC current to set a working point which defines the resonant frequency of the first oscillating circuit and makes it possible to obtain oscillation damping by a superposed alternating current.

According to example embodiments, the current is a direct current to which an alternating current is superposed whose amplitude is less than half of the value of the direct current. This has the advantage that the values of the first inductivities are controllable.

According to example embodiments, an alternating voltage component acquired at the DC-voltage-side output of the rectifier of the first converter is conveyed to a first controller, which adjusts the current, e.g., the alternating current, of the auxiliary winding such that the alternating voltage component is controlled to zero. This offers the advantage that harmonic vibrations coming from the small intermediate circuit are controllable in an active manner.

According to example embodiments, a second controller sets the direct current component of the current of the auxiliary winding such that the resonant frequency of the first oscillating circuit is controlled to a setpoint value. This is considered advantageous insofar as the damping is able to be optimized.

Further features and aspects of example embodiments of the present invention are described in greater detail below with reference to the appended schematic FIGURE.

BRIEF DESCRIPTION OF THE DRAWING

FIG. 1 schematically illustrates a drive system according to an example embodiment of the present invention.

DETAILED DESCRIPTION

A first converter has inside its housing 17 a rectifier 11, which is supplied from a public AC-voltage supply network 5, e.g., a three-phase voltage supply, at whose DC-voltage-side terminal the DC-voltage-side terminal of an inverter 12 is directly connected and a first capacitance C1 in parallel therewith.

This first capacitance C1 is arranged as a foil capacitor and, depending on the power of the first converter indicated in Kilowatt kW, has a value of 5 μF/kW or less. The first converter is therefore provided with a small intermediate circuit.

Connected at the alternating-voltage-side terminal of inverter 12 is an electric motor 15, which is, for example, arranged as a three-phase motor.

Accordingly, inverter 12 has three half bridges which are arranged in parallel and include a lower and an upper controllable semiconductor switch in each case, e.g., an IGBT or MOSFET, so that a three-phase voltage is able to be supplied on the motor side. The parallel circuit formed by the three half bridges is supplied from the voltage applied at the DC-voltage-side terminal of inverter 12. The semiconductor switches are actuated in a pulse-width modulated manner in each case.

Because of the low capacitance C1, intermediate circuit voltage Uz, that is to say, the voltage applied at the DC-voltage-side terminal of inverter 12, could fluctuate greatly given a large power consumption of inverter-fed electric motor 16 per network period. In order to prevent such an occurrence, the first converter has a first intermediate circuit terminal 14 to which upper potential +Uz of the intermediate circuit voltage, i.e., the voltage applied at the DC-voltage-side terminal of inverter 12, is routed and likewise lower potential −Uz of this intermediate circuit voltage.

A second converter also has inside its housing 7 a rectifier 1 which is supplied from public AC-voltage supply network 5, e.g., a three-phase voltage supply, at whose DC-voltage-side terminal the DC-voltage-side terminal of an inverter 2 is connected via inductivities, i.e., restrictors, L2. In parallel, a second capacitance C2 is connected at the DC-voltage-side terminal of inverter 2.

This second capacitance C2 is arranged as a foil capacitor or as a polar capacitor and depending on the output of the second converter indicated in Kilowatt kW, has a value of more than 15 μF/kW. The voltage applied at the DC-voltage-side terminal of inverter 2 is therefore stabilized.

An electric motor 6, which is, for example, arranged as a three-phase motor, is connected to the AC-voltage-side terminal of inverter 2.

Accordingly, inverter 2 also has three half bridges, which are arranged in parallel and include a lower and an upper controllable semiconductor switch such as an IGBT or MOSFET in each case, so that a three-phase voltage is supplyable on the motor side. The parallel circuit formed by the three half bridges is supplied from the voltage applied at the DC-voltage-side terminal of inverter 2. The semiconductor switches are actuated in a pulse-width-modulated manner in each case.

The DC-voltage-side terminal of inverter 2 as the first intermediate circuit terminal 4 is routed to the outside in the case of the second converter as well and connected to first intermediate circuit terminal 4 of the first converter via a restrictor, which is situated in a housing 13 and has inductivities L1.

Further support of the intermediate circuit is achievable in this manner, e.g., if one of the two converters is operated in a generator mode and the other in a motor mode.

However, the DC-voltage-side terminal of rectifier 1 is also routed to the outside on the second converter so that a further second converter is connectable by its DC-voltage-side terminal of its rectifier 1.

In this manner, the DC-voltage-side terminals of rectifiers 1 of the two converters are thus also switched in parallel and support one another.

Inductivities L1 together with capacitance C1 form an oscillating circuit whose resonant frequency amounts to, e.g., between 1 kHz and 2 kHz. Oscillations excited by the inverter of the first converter are therefore suppressed.

In each converter, inductivities L2 together with capacitance C2 form an oscillating circuit whose resonant frequency has a value that is smaller than 300 Hz. Thus, the intermediate circuit of the respective second converter is decoupled from the three-phase voltage supply.

The two upper potentials of the DC-voltage-side terminals of the inverters (2, 12) of the first and second converter are connected via a first inductivity L1. In the same manner, the two lower potentials of the DC-voltage-side terminals of the inverters (2, 12) of the first and the second converter are connected via a second inductivity L1.

The two inductivities L1 are arranged as a winding around a core, the core being the same for both inductivities.

First intermediate circuit connection 4 and second intermediate circuit connection 3 are arranged as a connection for current bars in each case.

Instead of being arranged for current bars, the first intermediate circuit connection 4 may be arranged for copper cables, that is to say, not for current bars.

An auxiliary winding may be provided at the first inductivities L1 and a current may be applied in each case so that the resonant frequency of the first oscillating circuit is able to be controlled to a setpoint value and an attempt is made to set harmonic oscillations to zero with the aid of an AC-voltage component of the current.

LIST OF REFERENCE CHARACTERS 1 rectifier
2 inverter
3 second intermediate circuit terminal
4 first intermediate circuit terminal
5 AC-voltage supply network, e.g., three-phase voltage supply
6 electric motor
7 housing of the second converter
11 rectifier
12 inverter
13 housing of the external restrictor
14 first intermediate circuit terminal
16 electric motor
17 housing of the first converter
L1 inductivity of the external restrictor
L2 inductivity of the internal restrictor
C1 first capacitance
C2 second capacitance
+Uz upper intermediate circuit potential of the first converter
−Uz lower intermediate circuit potential of the first converter
+Uz_2 upper intermediate circuit potential of the second converter
−Uz_2 lower intermediate circuit potential of the second converter

The invention claimed is:

1. A drive system, comprising:
a first converter including a first converter housing, a first rectifier arranged inside the first converter housing, and a first inverter, the first rectifier including a DC-voltage-side terminal connected and/or directly connected to a DC-voltage-side terminal of the first inverter;
a first capacitance connected in parallel with the DC-voltage-side terminal of the first inverter;
at least one second converter including a second converter housing, a second rectifier arranged inside the second converter housing, and a second inverter, the second rectifier including a DC-voltage-side terminal connected, via second inductivities, to a DC-voltage-side terminal of the second inverter; and
a second capacitance connected in parallel with the DC-voltage-side terminal of the second inverter;
wherein the DC-voltage-side terminal of the first inverter is connected via first inductivities to the DC-voltage-side terminal of the second inverter; and
wherein each first inductivity is arranged as a coil winding situated around a ferrite core, and an auxiliary winding to which a current is applied is arranged on each ferrite core.

2. The drive system according to claim 1, wherein the first inductivities are arranged inside a housing that is separate and/or set apart from the first converter housing and from the second converter housing.

3. The drive system according to claim 1, wherein the first inductivities are arranged as coil windings wound around a common coil core.

4. The drive system according to claim 1, wherein the second capacitance includes a foil capacitor and/or a polar capacitor.

5. The drive system according to claim 1, wherein the second capacitance has a value greater than 15 μF/kW, depending on an output of the second converter specified in kW.

6. The drive system according to claim 1, wherein the first capacitance includes a foil capacitor.

7. The drive system according to claim 1, wherein the first capacitance has a value of 5 μF/kW or less, depending on an output of the first converter specified in kW.

8. The drive system according to claim 1, wherein the DC-voltage-side terminal of the first inverter is routed outside to a first connection unit on the first converter housing.

9. The drive system according to claim 1, wherein the DC-voltage-side terminal of the second inverter is routed outside to a second connection unit on the second converter housing.

10. The drive system according to claim 1, wherein the DC-voltage-side terminal of the second rectifier is routed outside to a third connection unit on the second converter housing.

11. The drive system according to claim 10, wherein the third connection unit on the second converter housing is adapted to connect to a third connection unit on a housing of a further second converter.

12. The drive system according to claim 1, wherein the first inductivities and the capacitance form a first oscillating circuit and are dimensioned such that a resonant frequency of the first oscillating circuit is between 1 kHz and 2 kHz.

13. The drive system according to claim 1, wherein the second inductivities and the capacitance form a second oscillating circuit and are dimensioned such that a resonant frequency of the second oscillating circuit has a value that is smaller than six times a frequency of an AC-voltage system applied at an AC-voltage-side terminal of the second rectifier.

14. The drive system according to claim 13, wherein the resonant frequency of the second oscillating circuit is less than 300 Hz.

15. The drive system according to claim 1, wherein the current is a direct current to which an alternating current is superposed whose amplitude is smaller than half of a value of the direct current.

16. The drive system according to claim 1, wherein an AC-voltage component acquired at a DC-voltage-side output of the first rectifier is conveyed to a first controller adapted to set a current and/or an alternating current of the auxiliary winding to control the AC-voltage component to zero.

17. The drive system according to claim 16, wherein the first inductivities and the capacitance form a first oscillating circuit and are dimensioned such that a resonant frequency of the first oscillating circuit is between 1 kHz and 2 kHz, and a second controller is adapted to set a direct current component of a current of the auxiliary winding such that the resonant frequency of the first oscillating circuit is controlled to a setpoint value.

18. The drive system according to claim 1, wherein the first inductivities and the capacitance form a first oscillating circuit and are dimensioned such that a resonant frequency of the first oscillating circuit is between 1 kHz and 2 kHz, and a second controller is adapted to set a direct current component of a current of the auxiliary winding such that the resonant frequency of the first oscillating circuit is controlled to a setpoint value.

\* \* \* \* \*